United States Patent Office 3,600,307
Patented Aug. 17, 1971

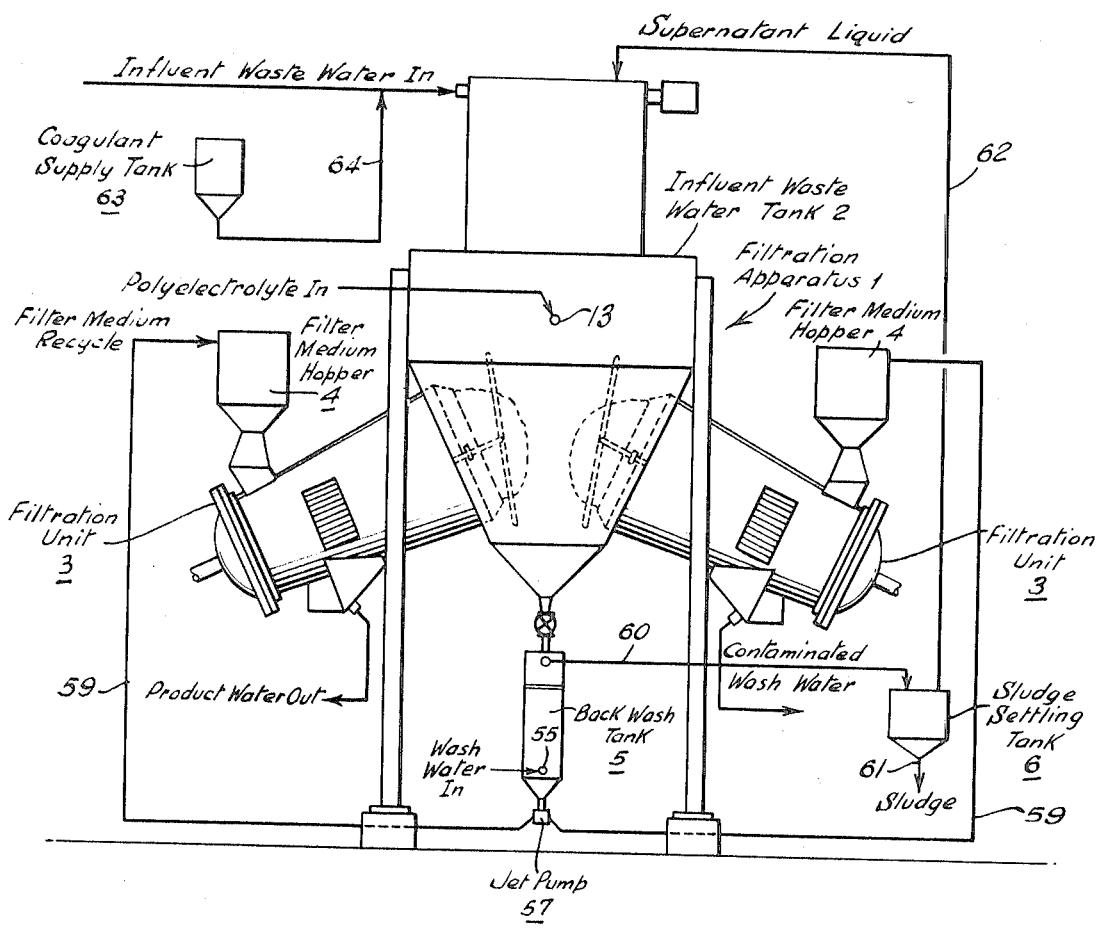

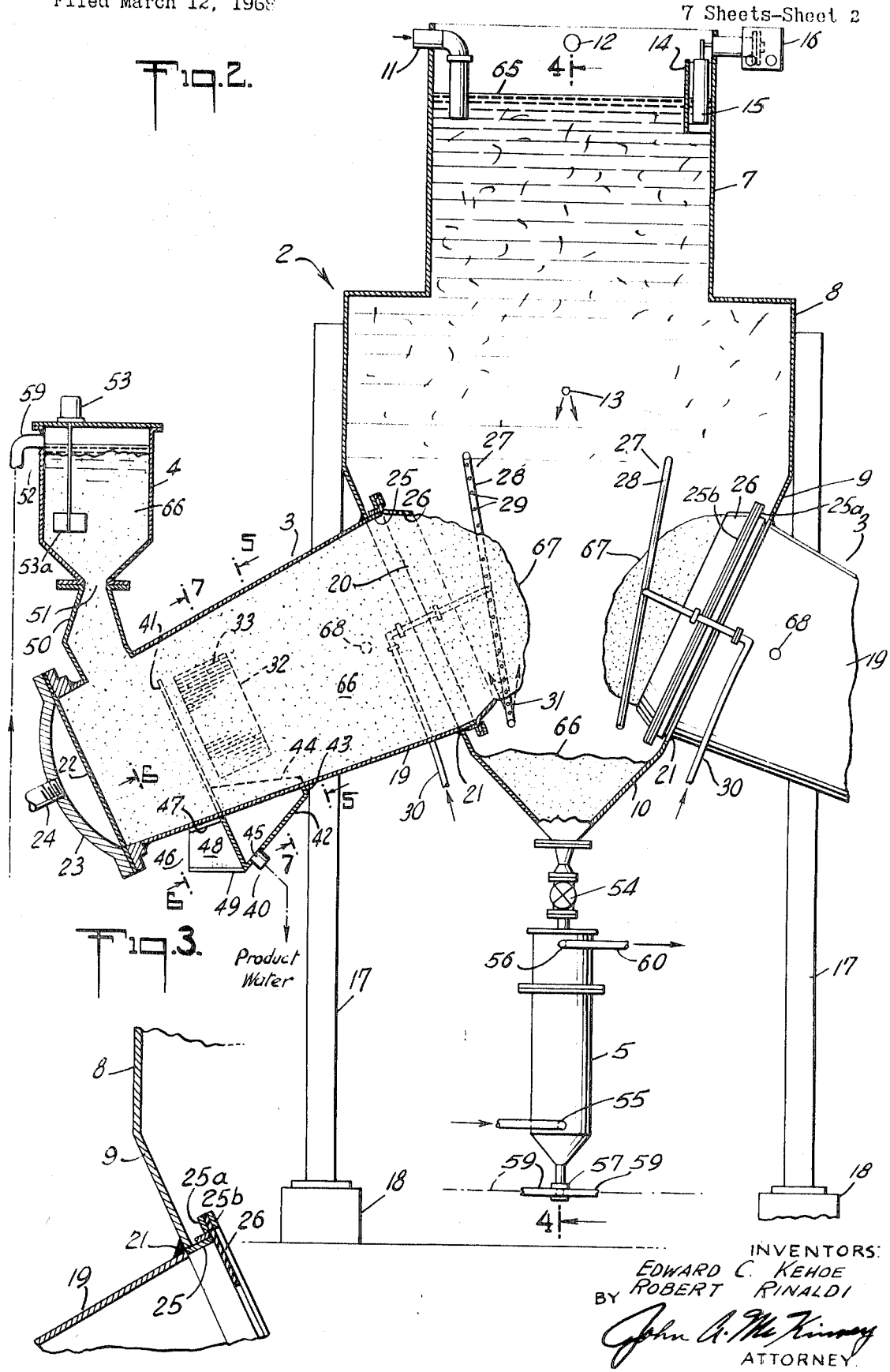

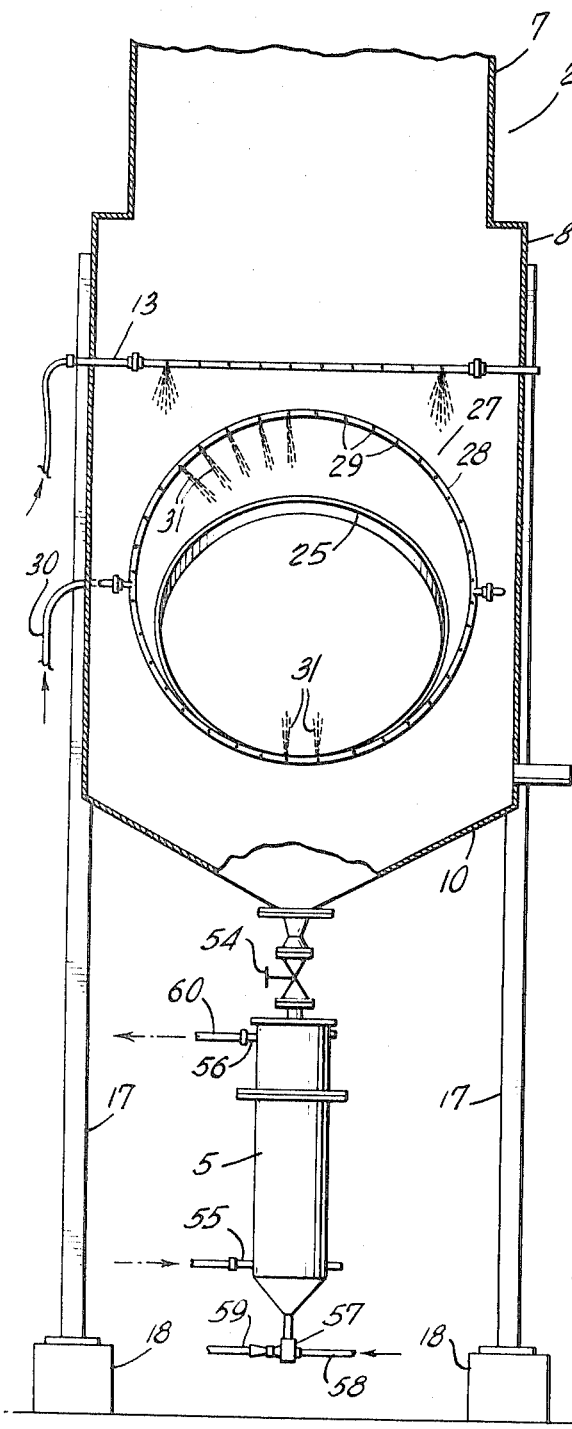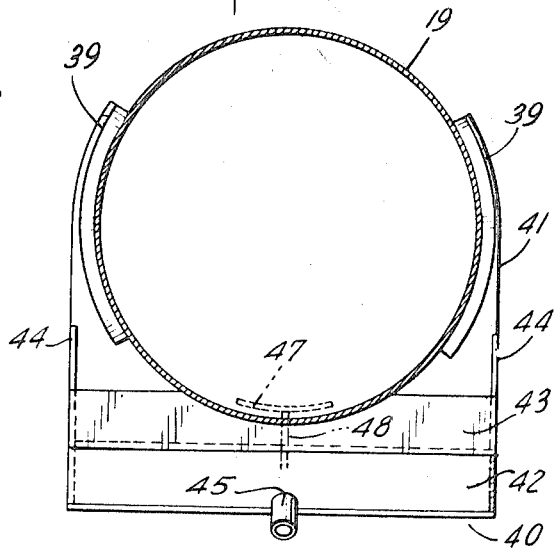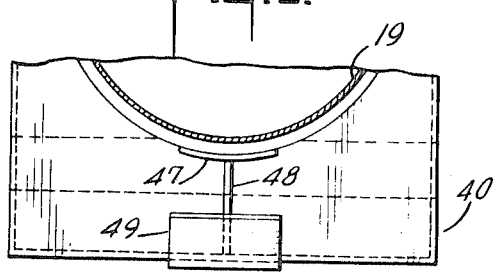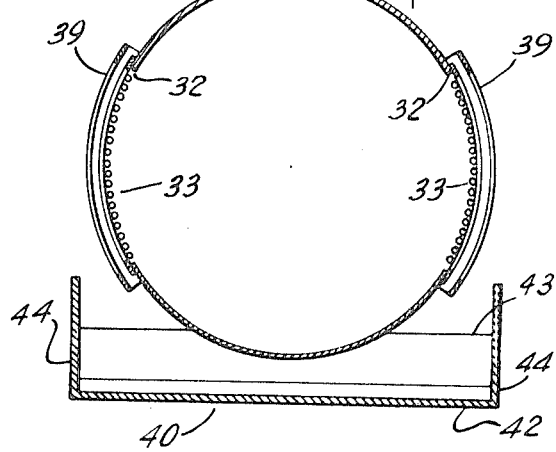

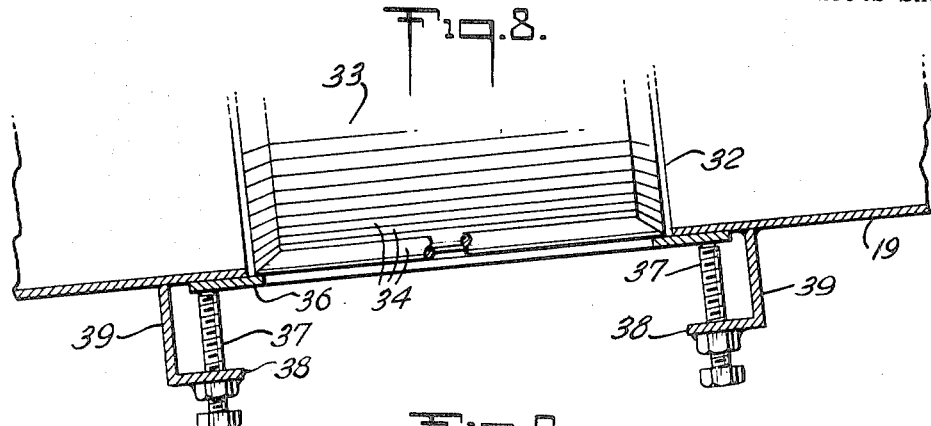
Fig. 8.
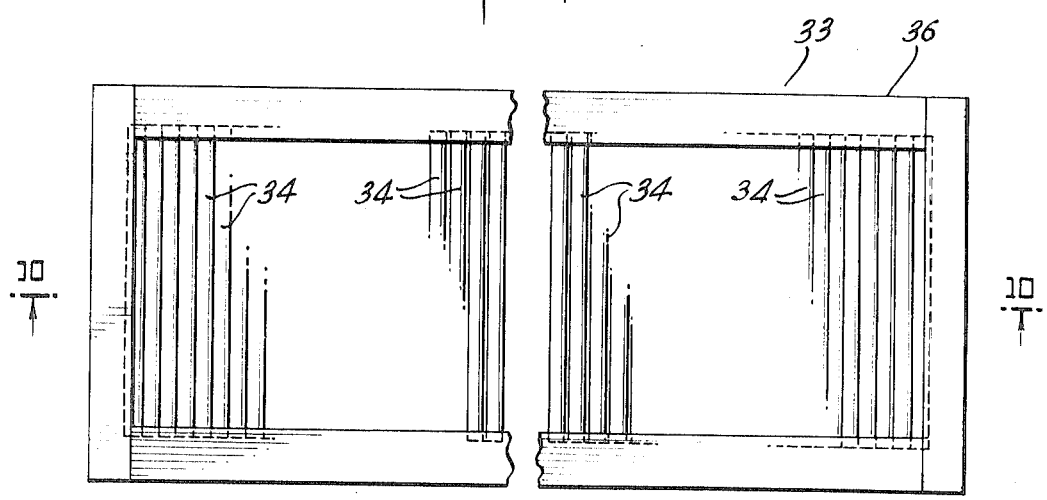
Fig. 9.
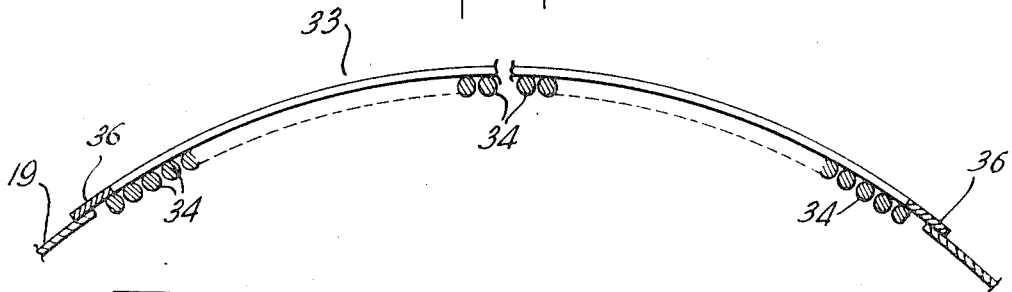
Fig. 10.
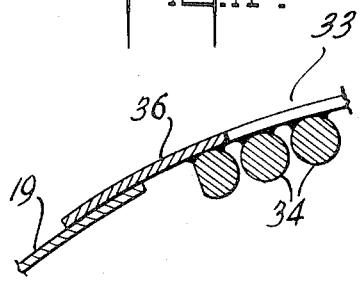
Fig. 11.
Fig. 12.
INVENTORS:
EDWARD C. KEHOE
ROBERT RINALDI
BY
ATTORNEY.

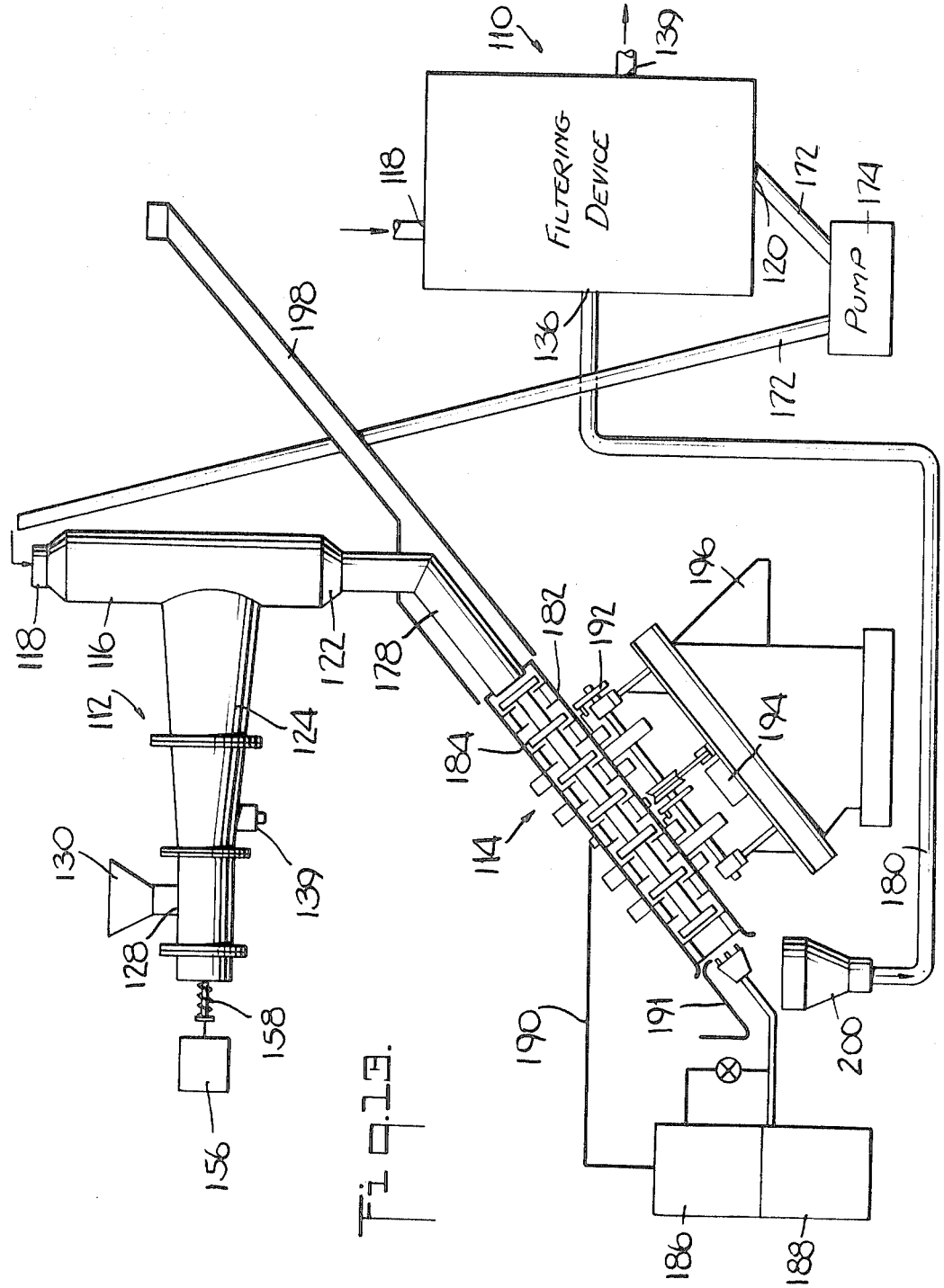

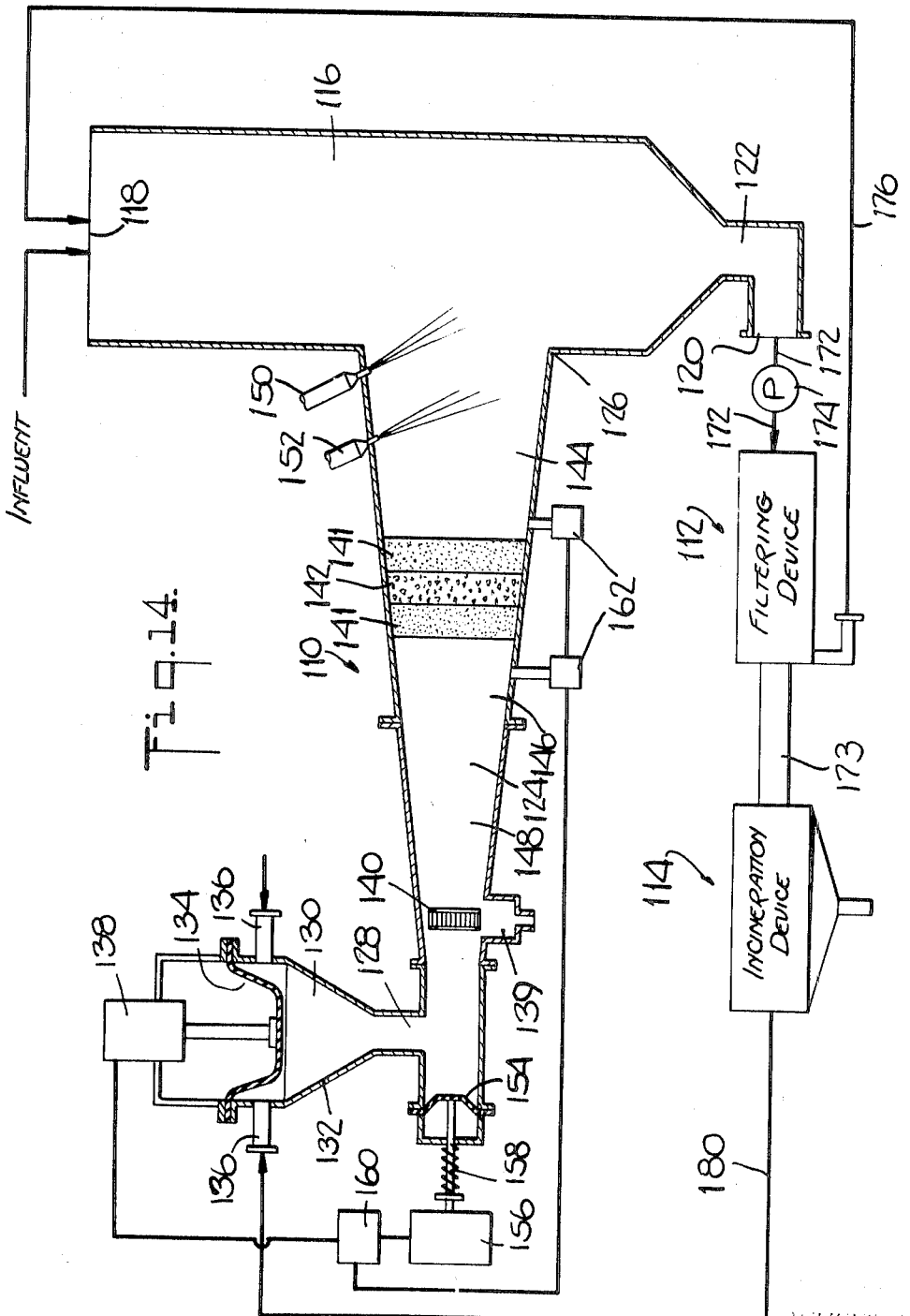

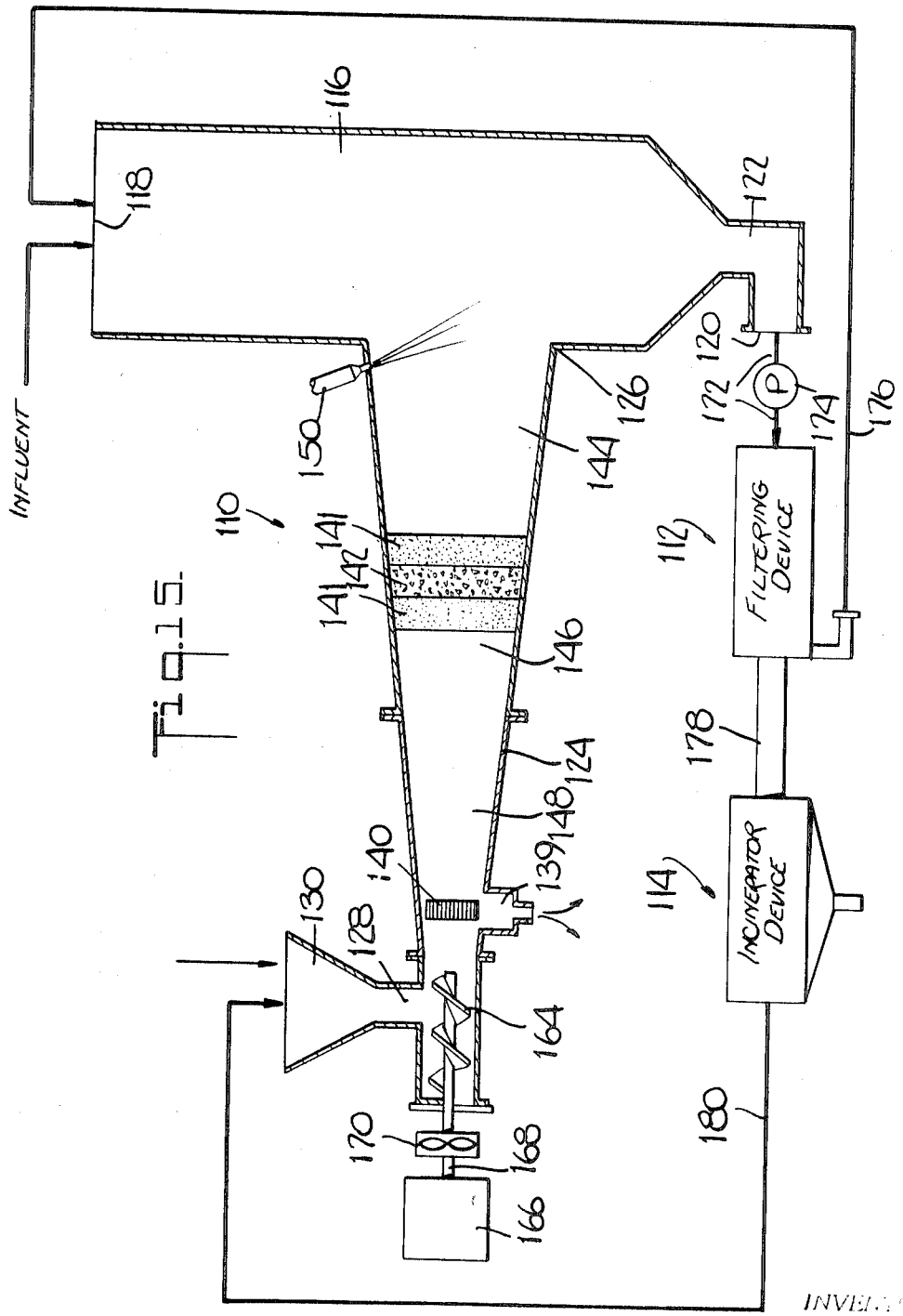

3,600,307
LIQUID PURIFICATION SYSTEM
Edward C. Kehoe, North Caldwell, and Robert Rinaldi, Fairfield, N.J., assignors to Johns-Manville Corporation, New York, N.Y.
Continuation-in-part of application Ser. No. 580,780, Sept. 20, 1966. This application Mar. 12, 1968, Ser. No. 716,269
Int. Cl. B01d 23/10
U.S. Cl. 210—33                                17 Claims

ABSTRACT OF THE DISCLOSURE

Suspended organic matter is continuously removed from sewage in a moving bed filter in which waste water flows countercurrent to a compact moving bed of a particular filter medium such as sand. Filtration is preferably carried out in an inclined frusto-conical chamber in which the filter medium moves upwardly. The apparatus can also be used for liquid treatment processes other than filtration.

PRIOR APPLICATION

This application is a continuation-in-part of our copending application Ser. No. 580,780, filed Sept. 20, 1966, now abandoned.

BACKGROUND OF THE INVENTION

Broadly speaking, this invention relates to apparatus and process for filtering. More particularly, this invention relates to apparatus and process for continuously filtering contaminants from waste water.

Water pollution has increased alarmingly in the United States in recent years. The increase in both municipal and industrial wastes discharged into waterways has killed fish and other forms of aquatic life, has polluted large numbers of streams formerly used for recreation, and has contaminated water supplies used by numerous cities and towns. The methods of sewage purification and treatment used up to the present time have proven inadequate for the task of abating stream pollution, and the prospect for further increases in water pollution is very high in view of the rapidly growing population and increase in level of industrial activity.

The methods of sewage treatment presently used differ widely. For convenience the steps in the treatment process are usually broken down into two groups, which are referred to as primary treatment and secondary treatment respectively. In primary treatment of sewage, large objects are screened out by means of a bar screen or other similar device. The sewage is then allowed to settle out in a sedimentation tann in order to remove a substantial quantity of suspended solids. In a typical operation about 50–60% of the organic contaminants in the sewage can be removed in this manner.

Some cities subject their sewage only to primary treatment, and then discharge the effluent into streams. In fact, some cities even discharge raw sewage, particularly during and after rainstorms. However, it is more usual to subject the primary effluent to further treatment. This further treatment may take variety of forms, all of which are generally lumped together under the heading of secondary treatment.

A widely used secondary treatment device is the trickling filter. A trickling filter is a large basin filled with a material such as crushed rock which provides a large surface area. The primary sewage effluent is allowed to trickle through the bed of rock, and bacteria on the surfaces of the rock cause further breakdown of the organic material in the sewage. The level of putrefiable matter is usually expressed in terms of biochemical oxygen demand (BOD). An efficiently run sewage treatment system including primary treatment as aforedescribed plus a trickling filter will remove about 80–85% of the BOD present in the raw sewage. In other words, about 15–20% of the BOD present in raw sewage will remain after secondary treatment, and will be discharged in the waste water into a stream or other waterway.

More complete removal of BOD can be obtained in an activated sludge treatment unit. In the activated sludge treatment unit, sewage after primary treatment is mixed with recycled activated sludge and introduced into the treatment unit. This mixture is aerated, and aerobic microorganisms cause breakdown of the major portion of organic material into suspended solids which can be separated by sedimentation. Usually about 85–90% of the BOD in raw sewage can be removed in a system comprising primary treatment plus an activated sludge treatment process. In other words, about 10–15% of the organic matter will remain after treatment. Occasionally the percentage of BOD removed may run as high as 95%.

Even the relatively small amount of BOD remaining after secondary treatment with either a trickling filter or an activated sludge treatment unit may cause undesirable water pollution. Advanced treatment devices (occasionally referred to as tertiary treatment devices) have been used to a limited extent. The main factors mitigating against their use have been the large area required, the low water throughput, and the high cost of operation.

Stationary sand filters have been used for advanced treatment of waste water. Secondary sewage effluent is allowed to trickle through a large bed of sand, and suspended solids are removed near the top of the bed. A coagulating agent such as alum is frequently added to the sewage stream before passage through the sand filter, in order to provide more complete removal of organic matter. The sand filter removes much of the BOD remaining after secondary treatment. However, the sand filter quickly loses its capacity as organic material clogs the top of the sand bed, and must be shut down and backwashed frequently in order to remove the organic matter.

All of the foregoing treatment devices are relatively inflexible in terms of water volume which can be handled. When the water flow increases markedly, as for example after a rain storm, the foregoing treatment devices are unable to handle the additional flow. Hence many cities bypass a substantial quantity of sewage around the entire treatment system and discharge raw sewage after rain storms. Even where excess capacity over that needed in normal flows is provided, the treatment devices are placed under a strain during periods of high flow, and the effluents generally contain considerably more BOD than the normal levels.

An increase in the amount of solids to be filtered in a given length of time, whether or not accompanied by an increased water flow rate, also imposes a burden on conventional water treatment devices which they cannot handle. Increased solids in the influent of a conventional sand filter, for example, requires more frequent back-washing of the filter, shortening the amount of time that the apparatus is on stream. This is a very serious drawback, because both water flow rates and solids levels in municipal sewage, and often too in industrial sewage, vary widely during the course of a day.

Continuous moving bed filters and filtration processes are known. However, such devices and processes have not been used to any significant extent for sewage treatment, and in any event, these devices and processes are quite different from the apparatus and process of the present invention.

OBJECTS OF THE INVENTION

An object of this invention is to provide an improved process and apparatus for treatment of liquids by contact with a countercurrently moving bed of particulate solid treatment medium.

A more specific object is to provide an improved process and apparatus for filtration of waste water using a countercurrently moving bed of particulate solid filter medium.

Another object is to provide an improved waste treatment system which includes the above-mentioned improved process and apparatus for waste water filtration.

Another object is to provide an improved process for removal of phosphate from waste water.

Another object is to provide a waste water treatment process which yields a substantially constant quality effluent over wide ranges of water flow and influent impurity concentrations. Other and further objects of this invention will become apparent during the course of the specification and by reference to the accompanying drawings and to the appended claims.

Novel continuous countercurrent process and apparatus are provided for treatment of liquids using a moving compact bed of a particulate solid treatment medium. According to the preferred embodiment of this process, the liquid to be treated is introduced into the bed of particulate solid treatment medium through an exposed forward face thereof, passed through the bed, and treated liquid withdrawn from the bed. Simultaneously, the particulate solid treatment medium is moved in a direction opposite to the direction of liquid flow, and spent particulate treatment solid medium is withdrawn from the forward face of the bed thereof so as to expose a new forward face of relatively fresh particulate solid treatment medium.

The process may be carried out in a preferred embodiment of apparatus comprising a treatment chamber having an opening at one end for introduction of liquid to be treated and for discharge of spent particulate solid treatment medium, and having a fresh particulate solid treatment medium inlet and a treated liquid outlet at the opposite end, and a liquid inlet chamber in communication with the treatment chamber for supplying untreated liquid and receiving spent particulate solid treatment medium.

The process and apparatus of this invention are especially useful for post-treatment of waste water which has received some earlier conventional treatment. specifically, waste water from a conventional sewage treatment process may be subjected to the process of the present invention in the apparatus of the present invention in order to reduce the BOD content of the waste water.

DRAWINGS

Referring now to the accompanying drawings in which like numerals represent like parts in the several views:

FIG. 1 represents a flow diagram of a preferred embodiment of process superimposed on a diagrammatic view in elevation of a preferred embodiment of apparatus.

FIG. 2 represents an enlarged view in elevation of the apparatus of FIG. 1, in partial medial vertical section to show the internal construction thereof.

FIG. 3 represents a further enlargement of a construction detail of FIG. 2, showing the shroud in planar position when not in use.

FIG. 4 represents a vertical section taken along the line 4—4 of FIG. 2, the shroud being omitted for purposes of clarity.

FIG. 5 represents an enlarged substantially vertical section through a filtration unit, taken along the line 5—5 of FIG. 2.

FIG. 6 represents an enlarged substantially vertical section through a portion of a filtration unit, taken along the line 6—6 of FIG. 2.

FIG. 7 represents an enlarged substantially vertical section through a filtration unit taken along the line 7—7 of FIG. 2.

FIG. 8 represents an enlarged fragmentary view in elevation, partially in section, of a filtration unit showing the movable bar screen assembly in position.

FIG. 9 represents a developed view in plan of the bar screen assembly.

FIG. 10 represents a view in section of the bar screen assembly mounted on a filtration unit, the means for holding the bar screen assembly in position being omitted for purposes of clarity.

FIG. 11 represents a further enlarged detail section of a portion of the bar screen assembly shown in FIG. 10.

FIG. 12 represents another further enlarged detail section of a portion of the bar screen assembly shown in FIG. 10.

FIG. 13 represents a diagrammatic view in elevation of another form of preferred embodiment of apparatus.

FIG. 14 represents a medial vertical section of one of the filtration units shown in FIG. 13.

FIG. 15 represents a view generally similar to FIG. 14, showing a modification of the filtering unit.

DETAILED DESCRIPTION OF THE INVENTION

Reference is now made to that embodiment of the invention shown in FIGS. 1–12.

Filtration apparatus 1 comprises influent waste water tank 2 communicating with one or more filtration units 3 (two such filtration units 3 being shown in FIGS. 1 and 2), filter medium hopper 4, backwash tank 5, and sludge settling tank 6.

Tank 2 comprises upper portion 7, main body portion 8, intermediate body portion 9, and centrally apertured bottom portion 10. Tank 2 is open at the top thereof, and is provided with waste water inlet 11, overflow 12 and conditioning chemical distributor 13. Baffle 14 in upper portion 7 defines a chamber receiving float 15 of conventional liquid level responsive controller 16, for a purpose to be hereinafter described. Tank 2 may be suitably supported by means of legs 17 secured to main body portion 8 and standing on foundations 18.

Each filtration unit 3 comprises a housing 19, which may be frusto-conical having an apex angle preferably in the range of 5° to 10°, the larger open end 20 thereof registering with aperture 21 in the intermediate body portion 9 of tank 2, whereby the interiors of housing 19 and tank 2, are in mutual communication, and the longitudinal axis of said housing 19 being perpendicular to the said intermediate body portion 9. The inside surface of housing 19 may be lined with a low friction material such as polytetrafluoroethylene (not shown) to reduce friction between the filter medium and the inside of hosusing 19. Housing 19 may be suitably seal welded to intermediate body portion 9 as shown. A flexible diaphragm 22 is mounted to the smaller end of housing 19, and a fluid chamber 23, also mounted to the smaller end of housing 19, and provided with fluid inlet 24 communicating with a source (not shown) of controllably varied fluid pressure communicating with one side of diaphragm 22. It will be apparent that, as the pressure within fluid chamber 23 is varied, the diaphragm 22 will be caused to flex toward or away from the larger end of housing 19.

Flange 25 is mounted to tank 2, in registry with aperture 21 and extending inwardly therefrom. An annular flange 25a is welded to flange 25. The periphery of annular shroud 26, of rubber or other elastomeric material, is mounted between flange 25a and annular plate 25b, suitable bolting means (not shown) being employed. Shroud 26 is designed to assume a planar position when not in use, as shown in FIG. 3 and to assume a frusto-conical position when in use, as shown in FIG. 2. Shroud 26 exerts a back pressure on the filter medium in filtration unit 3, insuring that housing 19 is completely filled therewith, thereby assuring a compact bed of filter medium and preventing channeling (i.e., short circuiting the waste water stream through the filtration unit 3).

A cutting device 27, suitably mounted adjacent the larger open end 20 of housing 19, comprises a circular or hoop-like pipe 28 generally circumscribing the open end 20, with a plurality of spaced apertures 29 arranged around the inner circumference of said pipe 28, whereby water introduced from a source of pressurized water (not shown) through conduit 30 will exit from pipe 28 in a series of inwardly directed sprays 31, for a purpose to be hereinafter described.

Housing 19 is provided with two product water openings 32 disposed on opposite sides of the said housing 19 as shown in the drawings. To permit the flow of product water through said openings 32, and to prevent the passage of filter medium through said openings 32, each opening 32 is provided with suitable screening means such as bar screen assembly 33.

Bar screen assembly 33 comprises a plurality of rods 34 having tapered ends 35 and welded to a frame 36 which is suitably curved, as shwon in the drawings, so as to conform with the circumference of housing 19. The diameter of rods 34 is approximately twice the thickness of the wall of housing 19, so that the longitudinal axes of rods 34 will lie on a circle of the same diameter as the inner wall of housing 19. The clear space between adjacent rods 34 is sufficiently less than the average particle size of the filter medium, thereby to prevent the passage of said filter medium through the bar screen assembly 33. For example, when using sand ranging between approximately 30 to 40 mesh as the filter medium, a clear spacing of approximately 0.015 inch between the adjacent rods 34 has been found to give excellent results.

To permit removal for cleaning, bar screen assembly 33 may be mounted to the exterior wall of housing 19 by means of bolts 37 threaded through legs 38 of curved angles 39, the said angles 39 being welded to the exterior wall of housing 19, and the said bolts 37 bearing against frame 36. It will be apparent that, when bar screen assembly 33 is to be removed for cleaning, bolts 37 are backed off, and the bar screen assembly 33 can be shifted around the circumference of housing 19 until frame 36 clears legs 38. Other ways for removably mounting bar screen assembly 33 to housing 19 over opening 32 will be apparent to those familiar with the art.

Filtration unit 3 is provided with water-collecting trough 40 mounted to housing 19 below water openings 32. Trough 40 comprises plate 41, preferably positioned perpendicularly to the longitudinal axis of housing 19 and provided with a circular cut-out conforming in size and shape to the exterior wall of housing 19, bottom plate 42, forward plate 43 and side plates 44, the said plates 41, 42, 43 and 44 being welded to each other and to housing 19 to form a water-tight collector basin in the said trough 40. A discharge conduit 45 is provided in plate 42 adjacent the bottom of the trough 40. Trough 40 is provided with a supporting structure 46 comprising bearing plate 47, gusset plate 48 and base plate 49. It will be apparent, from an inspection of FIG. 2 that water leaving opening 32 through bar screen assembly 33 will flow down the exterior wall of housing 19 and will be guided into trough 40 by plate 41.

Hopper 4 communicates with housing 19 of filtration unit 3 adjacent the smaller end thereof above diaphragm 22, through conduit 50 having a constriction or throat 51 therein to prevent backflow of filter medium from housing 19 to hopper 4. Inlet connection 52 is provided in hopper 4, through which a slurry of filter medium and water is introduced into the said hopper 4. Torque measuring device 53, comprising rotating paddle 53a, senses when the level of filter medium 66 has fallen below a predetermined safe elevation within hopper 4 (i.e., below paddle 53a), and may be arranged to sound an alarm or increase the motive water pressure in jet pump 57 to raise the level of filter medium 66 in hopper 4.

Backwash tank 5, communicating with the interior of tank 2 through the aperture in bottom portion 10 and through valve 54 is essentially a chamber in which downwardly flowing filter medium carrying foreign matter such as organic solids, etc., is scrubbed or washed by means of a countercurrent stream of wash water (from a source not shown). Accordingly, wash water inlet 55 is provided adjacent the lower end of backwash tank 5, and contaminated water outlet 56 is provided adjacent the upper end of wash water tank 5. A jet pump or eductor 57, indicated only diagrammatically in the figures and operated by high pressure water from pressurized water conduit 58, under the control of torque measuring device 53 as heretofore mentioned, is provided at the bottom of backwash tank 5, the intake of the eductor 57 communicating with the interior of the backwash tank 5 and being adapted to receive clean filter medium. The discharge of the eductor 57, consisting of the mixture of clean filter medium and high pressure water, is passed through recycle conduit 59 to inlets 52 on hopper 4.

Conduit 60 communicates between outlet 56 of backwash tank 5 and sludge settling tank 6. Sludge is removed from sludge settling tank 6 through conduit 61. Supernatant liquid may be recycled to tank 2 through conduit 62.

The operation of the embodiment of the invention shown in FIGS. 1–12 will now be described in detail with particular reference to the filtration of municipal wastes. It will, of course, be understood that the invention is capable of other applications such as industrial filtration and the like.

Waste water, typically a municipal effluent which has previously been subjected to primary and secondary treatment and in some instances to primary treatment alone, and which may contain both colloidal and finely divided suspended solid organic matter, is introduced into the upper end of tank 2 through inlet 11.

A coagulant, such as alum, may be introduced from supply tank 63 through conduit 64 into the waste water influent stream ahead of inlet 11. This causes colloidal particles in the waste water influent to coagulate into larger particles which can be removed from the waste water in filtration units 3. In place of alunm, other coagulants known to those familiar with the art may be used, such as ferric chloride or lime.

Waste water is maintained at such a level 65 in the upper portion 7 of tank 2 as to produce a desired static head at the level of the filtration unit 3 for reasons which will be explained hereinafter.

Conditioning chemicals may be introduced into the body of waste water within tank 2 through distributor 13. Thus, in the treatment of municipal sewage, it is frequently desirable to add a polyelectrolyte. The polyelectrolyte causes flocculation of the coagulated colloidal matter, facilitating its removal by filtration, and insures the adherence of suspended solid organic matter to the filter medium. This latter function is desirable for this causes small suspended solid particles to be trapped on the filter medium which particles might otherwise pass through the interstices of the filter medium into the product water stream. Conventional non-ionic polyelectrolytes, and particularly the polyacrylamides, which are long chained molecules with some branching and having molecular weights of about 1,000,000 to about 3,000,000 are preferred polyelectrolytes. These materials are regularly sold under such trademarks as "Separan" NP–10 (Dow Chemical Company, Midland, Mich.) and Magnifloc" 985N (American Cyanamid Company, Wayne, N.J.).

Filtration units 3 have been filled with particulate solid filter medium 66. Sand is an excellent filter medium for the treatment of municipal waste water. Other filter media which may be used are finely crushed rock, fly ash, charcoal, powdered coal, and the like. The use of charcoal may be especially advantageous for processes such as decolorizing in which both filtration and adsorption occur simultaneously. The filtered medium may range widely in particle size. Finer filter media produce filtrates of greater clarity than coarser filter media, due to the smaller size of the interstices between filter medium particles, but also produce higher head losses (greater pressure drops) resulting in lower flow rates. Sand filter media when used for sewage filtration in the apparatus and process of the present invention may advantageously have particles predominantly in the range of about 20 to 100 mesh. Such a broad particle size range is beneficial in obtaining satisfactory filtrate clarity consistant with satisfactory pressure drop and hence with satisfactory flow rate.

Filter medium 66 continuously moves through a closed cycle or loop through filtration apparatus 1. Thus, starting with hopper 4 as a point of reference, clear filter medium 66 is fed from the said hopper 4 through conduit 50 into the smaller lower end of filtration unit 3. Fluid pressure in fluid chamber 23 is controllably varied through conduit 24 to cause diaphragm 22 to alternately flex and advance toward the larger end of filtration unit 3 and flex and retract toward the smaller end of filtration unit 3. Movement of diaphragm 22 in the manner described produces an intermittent movement of the filter medium 66 from the smaller end of filtration unit 3 up to and out of the larger open end of the filtration unit 3, it being apparent that the taper of the housing 19 prevents or retards backflow of the filter medium 66 from the larger end to the smaller end of filtration unit 3 when diaphragm 22 is being retracted, thus permitting new filter medium 66 to enter the smaller end of filtration unit 3 from hopper 4 through conduit 50, it also being apparent that the taper of conduit 50 leading back to throat 51 prevents or retards backflow of the filter medium 66 from the smaller end of filtration unit 3 to hopper 4 when diaphragm 22 is being advanced.

As the filter medium 66 is advanced out of the open end 20 of housing 19 and out of shroud 26, causing the said shroud 26 to assume the frusto-conical attitude shown in FIG. 2, the said filter medium 66 presents a forward face 67 to the interior of tank 2. The initial contact between the waste water in tank 2 and the filter medium 66 is at this forward face 67, and most of the solids in the waste water are filtered out within a short distance back of this forward face. Flocculated colloidal matter penetrates further into the body of filter medium 66 before being removed from the liquid stream in filtration unit 3 and deposited on the said filter medium 66. Water level 65 in the upper portion of tank 2 is so determined as to produce a head adequate to force the waste water through the body of filter medium 66 within filtration unit 3 and out product water openings 32, whereupon the water product (which now has a very low concentration of suspended and colloidal organic matter) collects in trough 40 and is removed through conduit 45.

Organic solids, and particularly the solids in waste water, frequently act as binders. Thus, filter medium 66 forms a cohesive plug adjacent the forward face 67 and extending beyond the shroud 26 into tank 2. Cutting device 27 is operated, by forcing water into pipe 28 under such pressure as to produce sprays 31 around the entire circumference of the plug thereby to periodically or continuously, as desired, break up the plug and to cause the filter medium 66 to fall to the bottom of tank 2.

The dirty or used filter medium 66 now passes to the next portion of the cycle in which it is cleaned for reuse.

Valve 54 controls the flow of used filter medium 66 from tank 2 to backwash tank 5 in which the said used filter medium 66 is scrubbed or washed by a countercurrent flow of waste water. The clean filter medium 66 is withdrawn from the bottom of backwash tank 5 and pumped to hoppers 4 together with the high pressure water operating jet pump or eductor 57. Wash water contaminated with organic sludge removed from the surface of filter medium 66 in backwash tank 5 passes through conduit 60 to sludge settling tank 6. The sludge is allowed to settle in tank 6 and may be withdrawn therefrom through conduit 61. The supernatant liquid in tank 6 may be recycled through conduit 62 to tank 2.

Other forms of preferred embodiments of the invention as shown in FIGS. 13–15, will now be described.

In the embodiment of the invention illustrated in FIGS. 13 and 14, the purification apparatus comprises a first filtering device indicated generally at 110, a second filtering device indicated generally at 112, and an incinerator device indicated generally at 114. The second filtering device is similar to the first, but normally operates at different pressures as will be pointed out more fully hereinafter.

As seen in FIG. 14, the first filtering device 110 includes a closed chamber 116 having an upper inlet 118 for receiving a fluid to be purified. An outlet 120 is disposed at the other end of the chamber 116. This outlet has a restricted aperture 122 for building up sufficient pressure in the first chamber to cause the liquid influent to pass into a second chamber 124. The second chamber 124 is elongated and has one end in communication with the side wall of the first chamber as at 126. While the first chamber is shown in a vertical position and the second chamber is shown in a horizontal position, the relative positions of the chambers may be reversed so that the first chamber is horizontal and the second chamber is vertical. Also, the chambers may be positioned at angles one with respect to the other so that the angle therebetween is something different than 90 degrees.

The second elongated chamber 124 is provided with an inlet 128 which is supplied with filter material from a feed hopper is provided with conically shaped side walls 132 tapering inwardly towards the inlet 128. The feed hopper has a transversely disposed diaphragm 134 and material inlet pipe 136 located between the diaphragm and the inlet 128. A piston and cylinder or simple hydraulic diaphragm assembly 138 serves to reciprocate the diaphragm 134 to pressure feed the material received from the inlet pipe 136 into the chamber 124 through its inlet 128 forming a filter bed therein. In operation the filter bed moves through the second chamber from left to right as viewed in FIG. 14 and the inffluent liquid to be filtered flows in countercurrent flow from right to left in the second chamber 124, thereby forming a filtered product which is discharged through the outlet 139, the outlet being provided with a screen 140 having holes of suitable size to act as a screen for purposes of preventing the filter bed material from passing therethrough.

The filter material may be of various types and forms. It may comprise a multilayered filter bed including alternate layers of an active carbon adsorbent 141 and sand 142, or the bed may comprise all sand or all active carbon adsorbent. The active carbon adsorbent may include charcoal, a reactivated filter material, anthracite or fly ash, for example. The filter material may include a flocculating agent such as alum or it may include an absorbent additive such as an ion exchange resin.

Preferably the filter bed functions as a series of three substantially equal, but overlapping sections as generally indicated at 144, 146 and 148 in FIG. 14, respectively. The first or front section 144 acts like a strainer and removes the large particles from the influent. The second or middle section may be considered an attenuation section. That is, as shown in the illustrated embodiment of the invention, a flocculating agent such as alum is added to the influent and tends to form floc which is sticky and slimy and tends to stick to the surface of the particles. The bacteria and very small particles stick to the floc in the chambers between the particles. Thus, in this middle section an attenuation occurs. Several actions occur, one of which being the increase in velocity of the liquid as it passes into the chambers formed between the filtering particles and, thence, markedly decreases in velocity while in such chambers and then again speeds up to leave the chamber. The chamber itself acts like a sedimentation chamber or cell causing very small particles (even smaller than the spaces leading into and out of the chambers) to settle out in the chambers thus attenuating the material to be filtered out of the liquid. The third or rear section is a filter section. The term "filter" when used in connection with the third section is intended to mean a section which can act as an absorbent section and/or an absorbent section and/or an ion exchange section depending upon the characteristics of the media employed. For example, an activated carbon absorbent picks up acid, fatty acid, sugare, colloids and phenols according to the respective isotherms of these materials.

As best seen in FIG. 14, a spray nozzle 150 is disposed at the end of the second chamber adjacent the first chamber for purposes of cutting off or removing the filter material at the end of the filter bed. This nozzle may be periodically actuated or it may be operated continuously. A second spray nozzle 152 is disposed adjacent the filter bed in spaced relationship with respect to the first nozzle for intermittently removing a layer of filter material from the bed. For example, if alternate layers of sand and coal are being used as are often used in dual bed filter practice, the coal is gradually washed off the bed until the layer of sand appears at the front of the bed, and then the second spray nozzle is employed to completely wash off the sand layer, thereby always maintaining coal at the front of the filter bed as a true dual media filter.

As pointed out hereinbefore, the filter bed moves through the second chamber from left to right as viewed in FIG. 14. A means for moving this bed includes a transversely disposed diaphragm 154 located adjacent the inlet of the second chamber. The stroke of the diaphragm is of the order of about four inches and extends between a position outwardly of the inlet 128 and a position inwardly of the inlet. Any suitable motivating means 156 may be employed to reciprocate the diaphragm such as an electric motor or hydraulic pressure, for example. Resilient means, such as spring 158 are employed to assist the diaphragm in returning to its original position.

Any suitable control means 160 may be employed for controlling the reciprocating means 156. Such control means include a pair of spaced pressure taps 162 disposed along the side of the filter bed to register the pressure drop therebetween and thereby determine the extent of build-up of foreign material therein. Based on such determination, the frequency of reciprocation of the diaphragm is controlled and thereby the speed of movement of the filter bed is regulated. It will be appreciated that demands on the system vary considerably due to such factors as the weather which may involve storms or increased precipitation, the time of day, the seasons, etc. A speed of movement of the filter bed of the order of about one inch per hour or two feet per day has been found satisfactory.

As best seen in FIG. 14, the side walls of the second chamber 124 taper outwardly toward the first chamber, the angle of said walls being between about five degrees and about 15 degrees. This angularity of the side walls and the filter material act like a check or return valve so that the material will not move to the left, but only to the right as viewed in FIG. 14, even when the diaphragm is on its return stroke. The control means 160 also serve to coordinate the movement of the two diaphragms 134 and 154 so that when diaphragm 154 is in its outer position diaphragm 134 is in its inner position and when diaphragm 154 is in its inner position, diaphragm 134 is in its outer position, as viewed in FIG. 14.

As best seen in FIG. 15, the means for moving the filter bed in the second chamber 124 may comprise a worm or screw 164 rotated by motor means 166 which may be an electric motor rotatably connected to drive shaft 168, for example. In order to push the filter bed material through the chamber, the entire screw is reciprocated by means of cam 170 interposed between the drive shaft 168 and the screw 164. Thus, the motor means 166 serves to both rotate and reciprocate the screw 164.

As pointed out hereinbefore, the purification system includes a first filtering device 110 and a second filtering device 112, the latter device being similar to the first device. Sludge forming in the first device is passed through pipeline 172 having a conveyor or pump 174, FIGS. 14 and 15, and serves as the influent for the second device. It has been found satisfactory to subject the influent at the top of the first chamber in the first device to a pressure of abou 1 p.s.i.g., and to subject the influent at the top of the first chamber in the second device to a pressure of between about 800 p.s.i.g. and 1,000 p.s.i.g. Filtered product discharged from the second device is passed through pipe 176 and is thereby added to the influent entering the first device. The sludge from the second filtering or defluidizing device is passed through a gravity chute or pipe 178, FIGS. 14 and 15, to the incinerator device 114, and the discharge product outlet of the incinerator device 114, and the discharge product outlet of the incinerator device is connected by pipe 180 to the inlet 136 of the second chamber 124 of the first filtering device 110.

As best seen in FIG. 13, the incinerator device comprises a rotating barrel 182 and a floating or rolling chopper 184 mounted therein. This chopper serves to masticate the sludge and prevent compacting thereof in the barrel. Air 186 and gas 188 supplies are disposed towards the lower end of the barrel and a primary air line 190 interconnects the air supply with a central portion of the barrel. The device further comprises an ignitor 191, positioning plates 192, driving means 194 and an instrument panel 196, as shown. A blow-off stack 198 is positioned at the top of the barrel. A collecting pan 200 is provided which is connected to the pipe 180 and is disposed at the lower end of the barrel.

It will be appreciated that the overall system according to the invention is substantially self-sustaining. That is, the sludge removed from the influent is burned in the incinerator device in an oxygen or air starved atmosphere for increasing the carbon content, thereby forming reactivated or regenerated filter material which is collected in the collecing pan 200 for returning to the filter bed of the first filtering device. This recycling process improves the adsorbent characteristics of the filter material, as the organic carbon is converted to raw carbon.

From the foregoing description, it will be seen that the present invention contributes a new and improved process and apparatus for purifying liquid influent which substantially reduces the possibility of plugging the filter bed, which is continuous and has uniform filtering characteristics, and which may readily be controlled to adopt to varying extraneous operating conditions.

Although certain particular embodiments of the invention are herein disclosed for purposes of explanation, further modifications thereof, after study of this specification, will be apparent to those skilled in the art to which the invention pertains. Reference accordingly should be had to the appended claims in determining the scope of the invention.

What we claim is:

1. Apparatus for the treatment of liquid comprising:
    (a) means containing a compact bed of particulate solid filter medium, said means having an open end and the bed of filter medium having a forward face adjacent the open end,
    (b) means for introducing liquid to be treated into the bed through the forward face thereof,
    (c) outlet means in the containing means located a substantial distance from the forward face of the bed and intermediate the open end and the opposite end for removing treated liquid from the containing means,
    (d) means for moving the bed toward the open end of the containing means,
    (e) means for removing particulate solid filter medium from the forward face of the bed to expose a fresh surface of said filter medium, and (f) means for introducing fresh filter medium into the containing means at a location between said opposite end of the containing means and the outlet means.

2. Apparatus as recited in claim 1 wherein the compact bed of particulate solid filter medium is arranged so that liquid entering through the forward face thereof and travelling to the outlet means has an overall downward component of flow and wherein the means containing the bed of filter medium includes walls which converge away from the forward face of the compact bed to assist in maintaining the bed in compact form.

3. Apparatus as recited in claim 1 wherein the means for introducing liquid to be filtered comprises means for holding such liquid, said holding means communicating with the open end of the bed containing means so that the entire forward face of the bed is exposed to the liquid.

4. Apparatus as recited in claim 3 including additionally means for collecting sludge and spent particulate solid filter medium, said collecting means being located at the bottom of the means for holding liquid to be treated.

5. Apparatus as recited in claim 4 including additionally means for cleaning the spent particulate solid filter medium and for conveying the cleaned medium to the containing means to become a part of the compact bed of filter medium.

6. A method of treating a liquid comprising the steps of:
(a) introducing liquid to be treated to the forward face of a compact bed of particulate solid filter medium, the forward face extending beyond the open end of a container in which the bed is housed,
(b) moving the compact bed in a forward direction,
(c) flowing the liquid in a generally downward direction through the forward face and through at least a substantial portion of the length of the bed to filter the liquid,
(d) removing the filtered liquid from the container at the terminal portion of its generally downward flow at a location between the open end and the opposite end of the container, and
(e) removing spent particulate solid filter medium from the forward face of the compact bed to expose a fresh surface of said medium.

7. A process of treating a liquid as recited in claim 6 wherein the liquid to be treated is aqueous in nature and is introduced to the forward face of the compact bed of filter medium by exposing the forward face of the bed to a body of the liquid which substantially covers said forward face.

8. A method of treating a liquid as recited in claim 6 including the additional steps of collecting sludge and spent particulate solid filter medium removed from the compact bed, cleaning said spent filter medium, recycling the cleaned filter medium to the compact bed and introducing said cleaned filter medium into the container at a location between the open end and the opposite end of the container.

9. A method of treating a liquid as recited in claim 8, including the additional step of incinerating sludge after it has been collected.

10. A method of treating a liquid as recited in claim 6 wherein the filter material includes a flocculating agent.

11. A method of treating a liquid as recited in claim 6 wherein the filter material includes an adsorbent additive.

12. Apparatus for the treatment of liquid comprising:
(a) means containing a compact bed of particulate solid filter medium, the bed having a forward face,
(b) means for introducing liquid to be treated into the bed through the forward face thereof,
(c) outlet means in the containing means located a substantial distance from the forward face of the bed for removing treated liquid from the containing means,
(d) means for moving the bed forward,
(e) means for removing particulate solid filter medium from the forward face of the bed to expose a fresh surface of the filter medium,
(f) inlet means in the containing means communicating with a supply of particulate solid filter medium, and
(g) means for urging the filter medium toward the inlet means,
(h) the inlet means including a tapered conduit connecting the source of filter medium to the containing means, the conduit having a larger opening adjacent the containing means than adjacent the source of filter medium to assist in preventing back flow of the filter medium toward said source.

13. Apparatus for the treatment of liquid comprising:
(a) means containing a compact bed of particulate solid filter medium, said means having an open end and the bed of filter medium having a forward face adjacent the open end,
(b) means for introducing liquid to be treated into the bed through the forward face thereof,
(c) outlet means in the containing means located a substantial distance from the forward face of the bed for removing treated liquid from the containing means,
(d) means for moving the bed toward the open end of the containing means, and
(e) means for removing particulate solid filter medium from the forward face of the bed to expose a fresh surface of said filter medium,
(f) the means for moving the bed in a forward direction being a diaphragm means located so as to act upon the end of the bed opposite the forward face thereof.

14. Apparatus for the treatment of liquid comprising:
(a) means containing a compact bed of particulate solid filter medium, said means having an open end and the bed of filter medium having a forward face adjacent the open end,
(b) means for introducing liquid to be treated into the bed through the forward face thereof,
(c) outlet means in the containing means located a substantial distance from the forward face of the bed for removing treated liquid from the containing means,
(d) means for moving the bed toward the open end of the containing means, and
(e) means for removing particulate solid filter medium from the forward face of the bed to expose a fresh surface of said filter medium,
(f) the means for introducing liquid to be filtered comprising means for holding such liquid, said holding means communicating with the open end of the bed containing means so that the entire forward face of the bed is exposed to the liquid,
(g) the means containing the compact bed of filter medium being of generally cylindrical shape and comprising a flexible normally radially inwardly tapered end portion adjacent the forward face of the compact bed, said end portion being adapted to be forced in a radially outward direction by the moving bed and thus to exert a continuous biasing force on the moving bed opposite to the direction of movement thereof to assist in maintaining the bed in compact condition.

15. Apparatus for the treatment of liquid comprising:
(a) means containing a compact bed of particulate solid filter medium, said means having an open end and the bed of filter medium having a forward face adjacent the open end,
(b) means for introducing liquid to be treated into the bed through the forward face thereof,
(c) outlet means in the containing means located a substantial distance from the forward face of the bed for removing treated liquid from the containing means,
(d) means for moving the bed toward the open end of the containing means, and
(e) means for removing particulate solid filter medium from the forward face of the bed to expose a fresh surface of said filter medium,
(f) the means for removing the particulate solid filter medium from the forward face of the bed comprising means for directing water jets toward the compact bed adjacent the forward face thereof to shear the forward end portion of the compact bed to expose a fresh surface of the filter medium.

16. Apparatus for the treatment of liquid comprising:
(a) first means to maintain a compact bed of particulate solid filter medium and move it forward in a first direction, said bed having a forward face,
(b) second means to introduce liquid to be treated into said compact bed of particulate solid filter medium through the said forward face thereof from a body of liquid at least substantially covering said forward face, and under such pressure as to force said liquid through said compact bed in a second direction, said second direction being countercurrent to said first direction,
(c) third means to permit treated liquid to exit from said compact bed of particulate solid filter medium adjacent the rear thereof, and
(d) fourth means to remove spent particulate solid filter medium from the forward face of said compact bed,
(e) said fourth means comprising:
(1) an annular conduit circumscribing the second end of said housing and being provided on its inner circumference with a plurality of spaced apertures,
(2) supply means to introduce liquid under pressure into said annular conduit thereby to produce a plurality of inwardly directed sprays.

17. Apparatus as recited in claim 14 wherein the generally cylindrical containing means is conical in shape with the side walls thereof converging from the open end toward the opposite end.

References Cited

UNITED STATES PATENTS

| | | | |
|---|---|---|---|
| 1,604,649 | 10/1926 | Manning | 210—33 |
| 2,073,388 | 3/1937 | Elliott et al. | 210—268 |
| 2,646,171 | 7/1953 | Weiss | 210—268X |
| 3,252,899 | 5/1966 | Rice et al. | 210—40 |
| 1,045,830 | 12/1912 | Gates | 210—80 |

FOREIGN PATENTS

| | | | |
|---|---|---|---|
| 578,520 | 7/1946 | Great Britain | 210—33 |

MICHAEL ROGERS, Primary Examiner

U.S. Cl. X.R.

210—80, 265, 269

PO-1050
(5/69)

UNITED STATES PATENT OFFICE
CERTIFICATE OF CORRECTION

Patent No. 3,600,307          Dated Aug. 17, 1971

Inventor(s) Edward C. Kehoe et al

It is certified that error appears in the above-identified patent and that said Letters Patent are hereby corrected as shown below:

Column 1, line 54, change "tann" to --tank--; column 3, line 48, change "specifically" to --Specifically--; column 4, line 54, change "hosusing" to --housing--; column 5, line 23, change "shwon" to --shown--; column 6, line 44, change "alumn" to --alum--; column 8, line 42, change "inffluent" to --influent--; column 9, lines 6 and 9, change "absorbent" to --adsorbent--; column 9, line 10, change "sugare" to --sugars--; column 10, line 8, change "abou" to --about--; column 12, line 64 (Claim 14), between "moving" and "bed", insert --compact--.

Signed and sealed this 28th day of March 1972.

(SEAL)
Attest:

EDWARD M. FLETCHER, JR.         ROBERT GOTTSCHALK
Attesting Officer                Commissioner of Patents